(12) United States Patent
Masterton

(10) Patent No.: US 7,201,419 B2
(45) Date of Patent: Apr. 10, 2007

(54) EXPANDABLE TAILGATE

(75) Inventor: Patrick Masterton, 1105 Brighton Dr., Carol Stream, IL (US) 60188

(73) Assignee: Patrick Masterton, Carol Stream, IL (US)

( * ) Notice: Subject to any disclaimer, the term of this patent is extended or adjusted under 35 U.S.C. 154(b) by 0 days.

(21) Appl. No.: 11/325,065

(22) Filed: Jan. 3, 2006

(65) Prior Publication Data

US 2006/0145505 A1    Jul. 6, 2006

Related U.S. Application Data

(60) Provisional application No. 60/640,265, filed on Jan. 3, 2005.

(51) Int. Cl.
*B62D 33/03*    (2006.01)

(52) U.S. Cl. ..................................... 296/26.1; 296/57.1

(58) Field of Classification Search ................ 296/57.1, 296/62, 26.08, 26.09, 26.1, 26.11
See application file for complete search history.

(56) References Cited

U.S. PATENT DOCUMENTS

| | | | | |
|---|---|---|---|---|
| 6,082,801 A * | 7/2000 | Owen et al. | ............. | 296/26.11 |
| 6,257,637 B1 * | 7/2001 | Reed | ................. | 296/26.08 |
| 6,454,338 B1 * | 9/2002 | Glickman et al. | ....... | 296/26.11 |
| 6,932,404 B2 * | 8/2005 | Vejnar | ................. | 296/26.09 |
| 6,966,595 B2 * | 11/2005 | Bruford et al. | ............ | 296/57.1 |
| 6,983,972 B2 * | 1/2006 | Tan et al. | ................. | 296/57.1 |
| 6,994,363 B2 * | 2/2006 | Seksaria et al. | ............ | 296/26.1 |

* cited by examiner

*Primary Examiner*—Jason Morrow
(74) *Attorney, Agent, or Firm*—The Eclipse Group LLP

(57) ABSTRACT

A tailgate with a fixed portion and an expandable portion where the expandable portion is pivotally coupled to the fixed portion.

18 Claims, 3 Drawing Sheets

EXPANDABLE TAILGATE

RELATED APPLICATIONS

This application claims priority under 35 U.S.C. § 119(e) to U.S. Provisional Patent Application No. 60/640,265 filed Jan. 3, 2005 entitled "EXPANDABLE TAILGATE," by Patrick Masterton, and is incorporated by reference herein.

BACKGROUND OF THE INVENTION

1. Field of the Invention.

This invention relates generally to vehicle tailgates and more particularly to configurable tailgates.

2. Related Art.

Some types of vehicles, such as pickup trucks and sports utility vehicles have tailgates that may be either in the closed position or folded down position. These vehicles are often used to haul multiple items or large items that prevent the tailgate from being placed into a closed position. When hauling such items with the tailgate in the folded down position, ropes or other securing methods are often used to keep the items from falling out the open tailgate.

Previous approaches to address the problems have been to remove tailgates from vehicles and use nets, ropes, or similar flexible devices to secure items being hauled. But, removing the tailgate from a vehicle often requires tools and space to store the removed tailgate. Furthermore, the removal of a tailgate may reduce the structural integrity of the vehicle and increase the risk of damage to the vehicle and vehicle occupants. Other approaches have also involved using a barrier that is attached to the tailgate after the cargo has been loaded. The barrier must subsequently be removed to allow the cargo to be unloaded. Still other approaches require that the extender be deployed prior to the loading of the cargo.

Therefore, there is a need for methods and systems for improving the ability of a vehicle with a tailgate to haul multiple or large items that overcomes the disadvantages set forth above.

SUMMARY

Systems consistent with the present invention provide an approach for fabricating and operating an expandable tailgate. The expandable tailgate may include an integral internal tailgate with individual sliding members. The expandable tailgate may mount to an existing tailgate in a vehicle such as a pickup truck or SUV, or the expandable tailgate may be a replacement for an existing tailgate.

The expandable tailgate may be able to expand by sliding the sliding members out of the tailgate in order to increase the support area of the tailgate. The sliding member may also be pivotally mounted to the tailgate to enable the sliding member to pivot upward making a secondary tailgate that may aid hauling or securing item.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Unlike the known approaches previously discussed, a vehicle tailgate is fabricated that has and extendable portion that may be hinged to provide additional support and protection for items being hauled.

Figure 1:
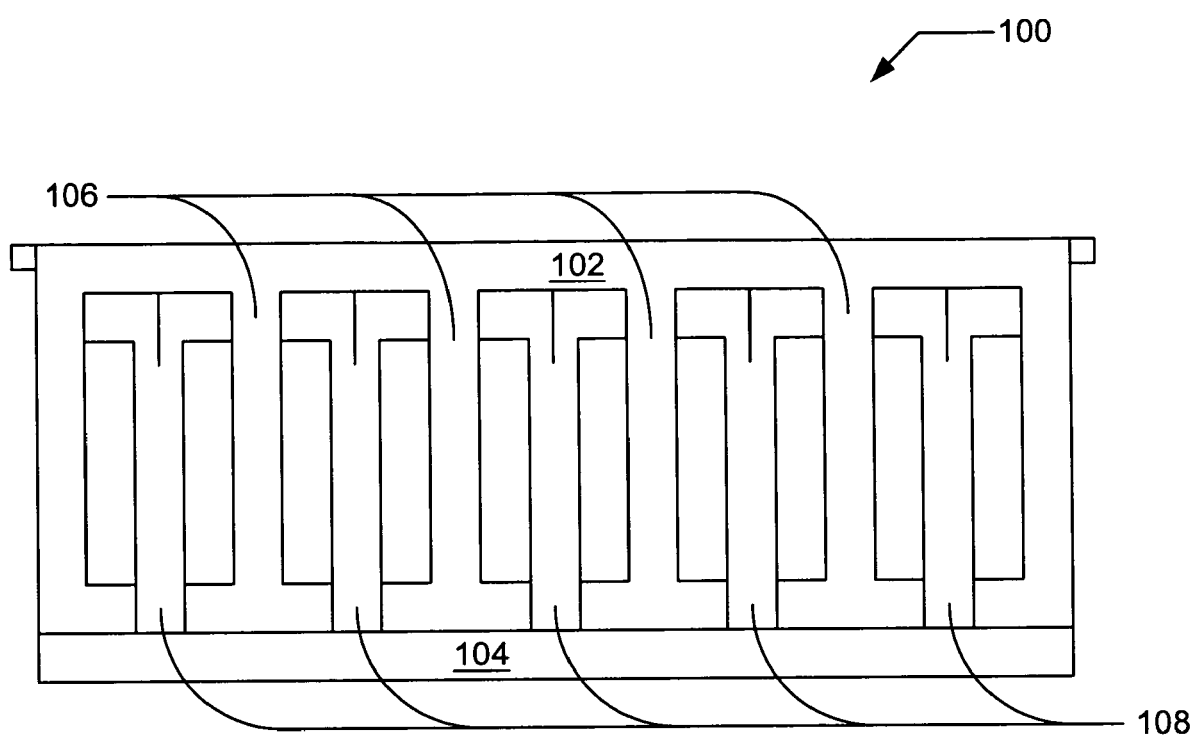
FIG. 1 illustrates a perspective interior view of a tailgate with an expandable portion in a closed position.

Turning first to FIG. 1, an illustration of a perspective interior view 100 of a tailgate 102 with an expandable portion 104 in a closed position. The interior view 100 of tailgate 102 shows a plurality of fixed members 106 and a plurality of sliding member 108. The plurality of fixed members 106 is secured together forming the tailgate 102 that form a plurality of tracks that may accept the expandable portion 104. The plurality of sliding members 108 are shown as be connected together forming an individual expandable portion 104. A surface may be attached to some or all of the fixed members 106, while allowing the sliding member to travel within respective tracks. Thus, the plurality of sliding members 108 is restrained by the plurality of fixed members 106. In other implementations, the fixed members 106 that support the expandable portion 104 may be attached to an existing tailgate.

The fixed members 106 and sliding members 108 may be formed of metal, fiberglass, or resin by casting, stamping, rolling, milling or with other known metal, fiberglass, or resin forming approaches. Similarly, the surface may be formed by casting, stamping, rolling, milling, or with other known metal, fiberglass, or resin forming approaches. A combination of the above approaches may also be employed to form the fixed members 106, sliding members 108 and sheet.

Figure 2:
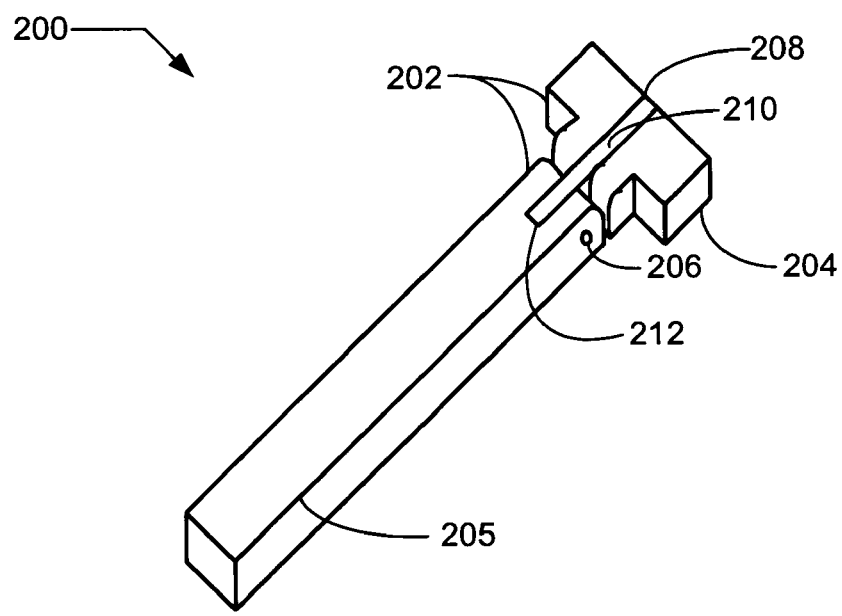
FIG. 2 illustrates a perspective view of an individual sliding member of the tailgate of FIG. 1.

In FIG. 2, an illustration of a perspective view 200 of an individual sliding member 202 from the tailgate 102 of FIG. 1 is shown. The sliding member may have a base portion, such as "T" shaped base 204 that is pivotally coupled to the upright portion 205 of the sliding member 202. The coupling of the "T" shaped base 204 to the upright portion 205 may be via a pivot pin 206, but in other implementations, screws, rivets, tabs, or any other known approach to pivotally attach the "T" shaped base 204 to the upright portion 205.

The "T" shaped base 204 may have a slot 208 that accepts an interconnect linkage 210. The interconnect linkage 210 may protrude a fixed distance from the "T" shaped base 204 and may engage into another slot 212 in upright 205. The interconnect linkage 210 may be formed from metal such as iron, steel, aluminum, or other such material that is strong enough to enable pivoting without breaking. The pivoting is preferably enabled in a 90-degree range of motion from a horizontal position to a vertical position. The interconnect linkage 210 may be fixed in the "T" shaped base 204 and upright 205 with fasteners, such as rivets. In other implementations, the interconnect linkage 210 may be eliminated and the "T" shaped base may directly couple with the upright 205.

The end of the upright 205 that has the other slot 212 may be formed or shaped so that the upright may rotate about the pivot pin without interference from the "T" shaped base 204. Molding, milling, or cutting the end of the upright 205 may accomplish the forming or shaping. In other implementations, the linkage 210 may be of sufficient length to allow adequate clearance for the "T" shaped base 204 to pivot about the pivot pin 206 and upright 205.

In other implementations, the interconnect linkage 210 may be wider than the slot 208 and 212. The interconnect linkage 210 may be an inch and connected to the "T" shaped base 204. Further, the upright 205 may be a divided upright that appear to be connected on the right and left side of the interconnect linkage 210 with the slot 212 being formed by the divided upright.

Figure 3:
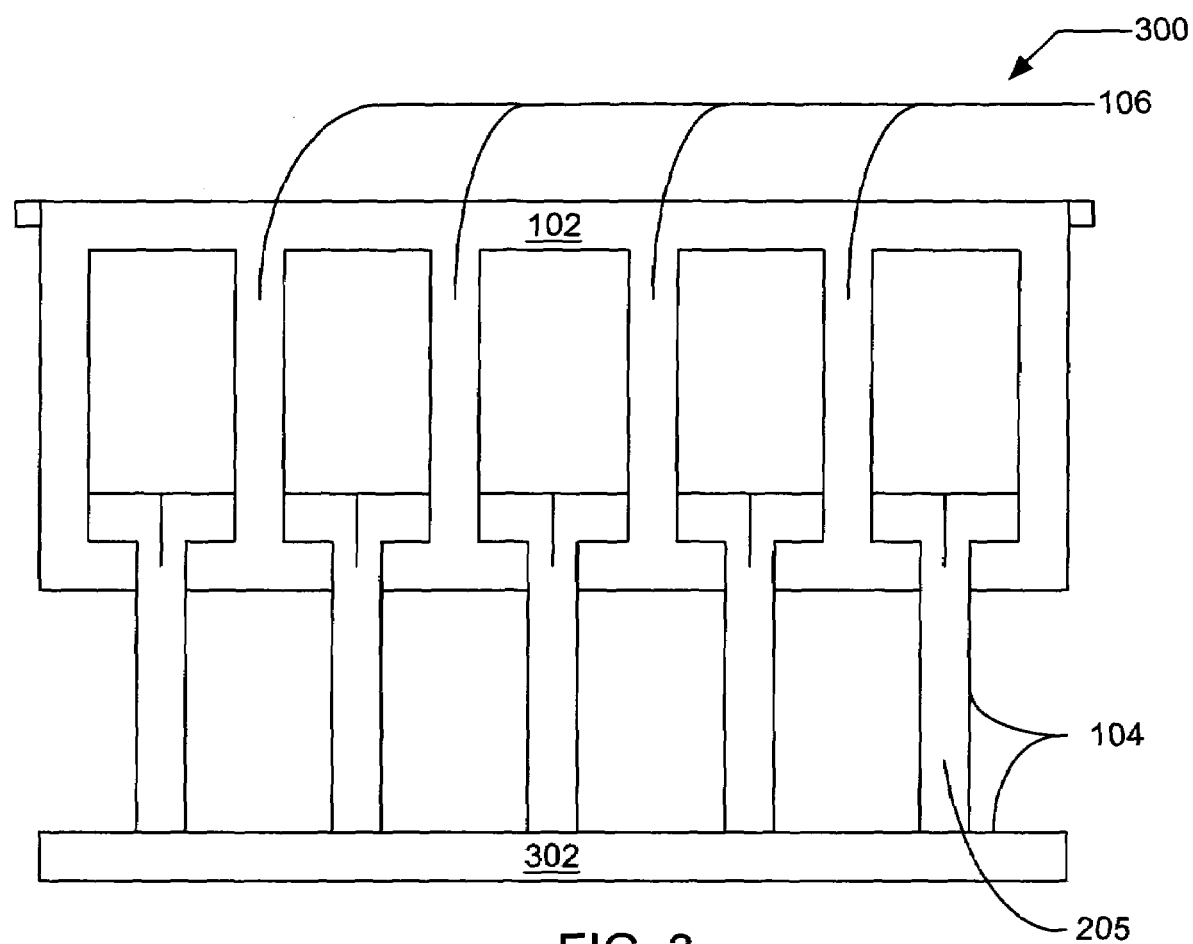
FIG. 3 illustrates a perspective interior view of the tailgate of FIG. 1 with the expandable portion in the extended position.

Turning to FIG. 3, an illustration of a perspective interior view 300 of the tailgate 102 of FIG. 1 with the expandable portion 104 in the extended position is shown. Each of the sliding members 202 that forms the expandable portion is able to travel in two directions within a plane (i.e. in and out). The fixed members 106 secure the sliding members 202 from movement in other directions than in and out directions. Further, the "T" shaped base 204 prevents the sliding members 202 from exiting the fixed members 106. The uprights, such as upright 205 may be coupled, connected or formed with a cross member 302. Enabling the cross member 302 to control the position of the plurality of uprights.

Figure 4:
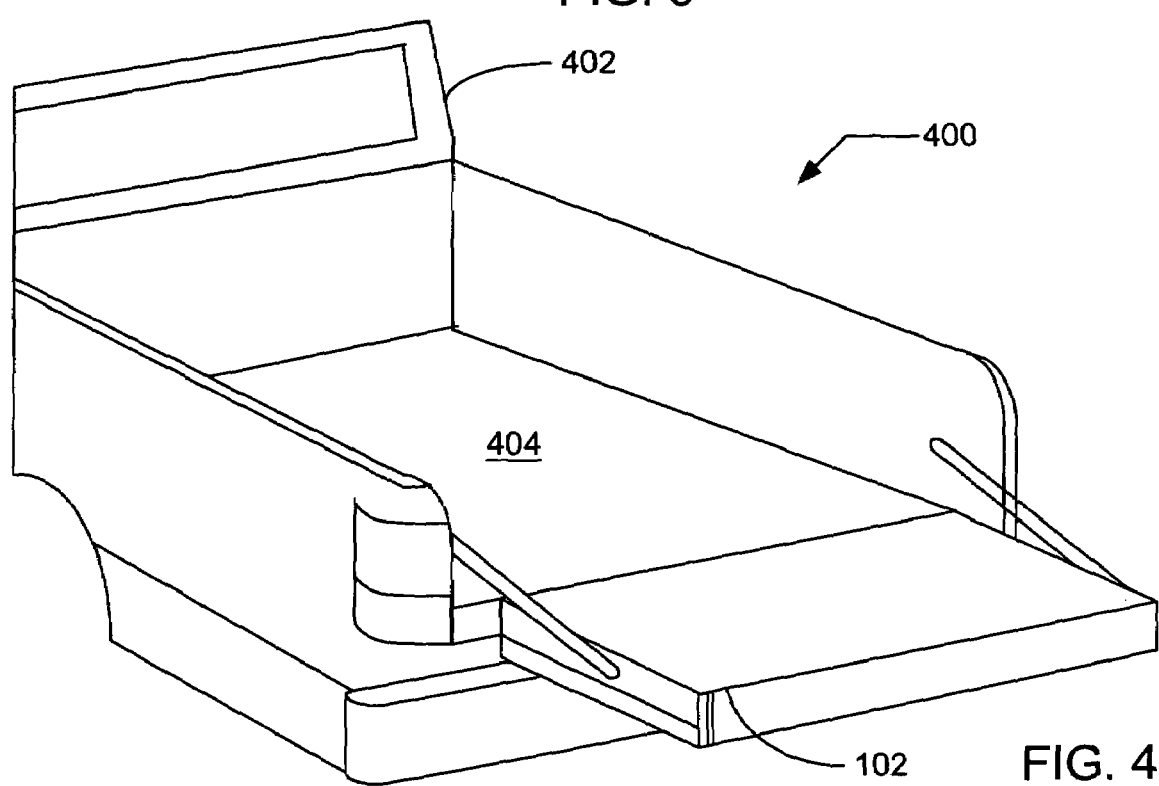
FIG. 4 illustrates a perspective view of a vehicle with the tailgate of FIG. 1 in the down position.

In FIG. 4, an illustration of a perspective view 400 of a vehicle 402 with the tailgate 102 of FIG. 1 in the down position and unexpanded. The tailgate 102 may be coupled to a vehicle in a manner similar to the pivotal mounting to the vehicle of traditional tailgates. In the down position, the tailgate 102 is an extension of the bed 404 of the vehicle 402. The tailgate 102 does not interfere or obstruct loading the vehicle 402, nor does the tailgate 102 need to be removed from the vehicle 402. After loading is complete, the expandable portion of the tailgate may be withdrawn into the horizontal position. The tailgate may be closed and latched using the mechanisms typically found in vehicles. In other implementations, securing pins may be used to secure the tailgate 102 in the closed position.

Figure 5:
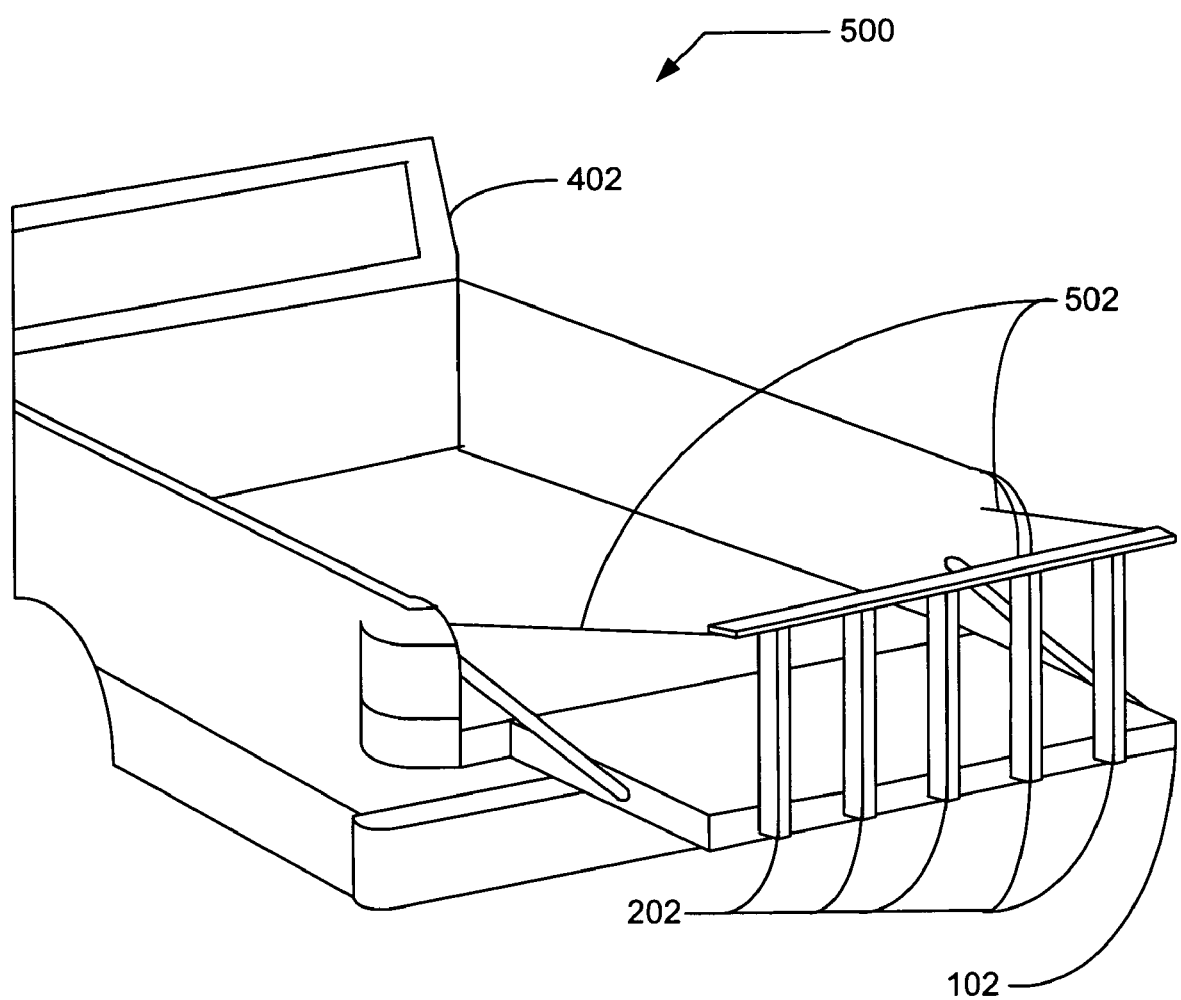
FIG. 5 illustrates a perspective view of the vehicle with the expandable of the tailgate of FIG. 1 in the extended and upright position.

Turning to FIG. 5, an illustration of a perspective view 500 of the vehicle 402 with the expandable of the tailgate 102 of FIG. 1 in the extended and upright position. The sliding members 202 are pivoted into the upright position. A securing member 502, such as one or more cables, ropes, chains, bars, or netting secures the sliding members 202 in the upright position and connects to the vehicle 402. Netting is preferred because it provides additional security by enclosing the opening formed by the upright sliding members 202, tailgate 102 and vehicle 402.

The foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. An expandable tailgate for a vehicle, comprising:
    a plurality of fixed members secured together; and
    a plurality of sliding members secured together, such that the plurality of sliding members are restrained by the plurality of fixed members and results in the sliding members of the expandable tailgate to be able to be in a closed position or an expanded position without being removed from the vehicle or hindering loading and unloading of cargo and where each of the plurality of sliding members has an upright portion and a base portion where the base portion is coupled to the upright portion and the base portion is a "T" shaped base portion and both the upright portion and the base portion are able to slide with the upright portion pivotally coupled to the base portion.

2. The expandable tailgate of claim 1, where the plurality of sliding members is made out of a metal.

3. The expandable tailgate of claim 2, where the metal is aluminum.

4. The expandable tailgate of claim 1, where the plurality of sliding members is made out of at least one material selected from a group consisting of metal, resin, and plastic material.

5. The expandable tailgate of claim 1, further includes at least one surface secured to the expandable tailgate to cover the plurality of fixed members.

6. The expandable tailgate of claim 1, further includes a pivot pin to couple the upright portion to the base portion.

7. The expandable tailgate of claim 6, where the upright portion is able to pivot about the pivot pin in relation to the base portion.

8. The expandable tailgate of claim 7, where at least one net covers an opening formed by the upright portion and the base portion when the upright portion is in an upright position.

9. The expandable tailgate of claim 7, where a securing member holds the upright portion in an upright position.

10. The expandable tailgate of claim 9, where the securing member is a wire cable.

11. The expandable tailgate of claim 7, where the securing member is a net.

12. The expandable tailgate of claim 1, where the expandable tailgate replaces the vehicle tailgate.

13. The expandable tailgate of claim 1, where the expandable tailgate is attachable to an existing tailgate on the vehicle.

14. The expandable tailgate of claim 1, where the expandable tailgate is incorporated into an existing tailgate.

15. An method of expanding a tailgate in a vehicle, comprising:
    securing a plurality of fixed members together; and
    securing a plurality of sliding members together, such that the plurality of sliding members are restrained by the plurality of fixed members and results in the sliding members of the expandable tailgate to be able to be in a closed position or an expanded position, where the plurality of sliding members need not be removed when changing from the closed position to the expanded position and where each of the plurality of sliding members has an upright portion and a base portion where the base portion is coupled to the upright portion and the base portion is a "T" shaped base portion where both the upright portion and the base portion are able to slide and the upright portion is pivotally coupled to the base portion.

16. The method of claim 15, further includes pivoting the plurality of sliding members in relationship to the plurality of fixed members.

17. The method of claim 15, further includes expanding the tailgate to the expanded position without interfering with loading or unloading of cargo.

18. The method of claim 15, further includes expanding the tailgate after cargo is loaded onto the vehicle.

* * * * *